(12) United States Patent
Karina et al.

(10) Patent No.: US 12,427,486 B2
(45) Date of Patent: Sep. 30, 2025

(54) ALKALI-STABLE NANOFILTRATION COMPOSITE MEMBRANE AND METHOD OF MANUFACTURE THEREOF

(71) Applicant: BL TECHNOLOGIES, INC., Minnetonka, MN (US)

(72) Inventors: Zedda Karina, Leipzig (DE); Carsten Schellenberg, Leipzig (DE); Judith Richter, Muldestausee (DE)

(73) Assignee: BL TECHNOLOGIES, INC., Minnetonka, MN (US)

( * ) Notice: Subject to any disclaimer, the term of this patent is extended or adjusted under 35 U.S.C. 154(b) by 997 days.

(21) Appl. No.: 17/253,653

(22) PCT Filed: Jun. 24, 2019

(86) PCT No.: PCT/EP2019/066585
§ 371 (c)(1),
(2) Date: Dec. 18, 2020

(87) PCT Pub. No.: WO2020/002185
PCT Pub. Date: Jan. 2, 2020

(65) Prior Publication Data
US 2021/0252458 A1      Aug. 19, 2021

(30) Foreign Application Priority Data

Jun. 27, 2018 (EP) .................................... 18180001

(51) Int. Cl.
| | |
|---|---|
| C02F 1/44 | (2023.01) |
| B01D 61/02 | (2006.01) |
| B01D 67/00 | (2006.01) |
| B01D 69/02 | (2006.01) |
| B01D 69/12 | (2006.01) |
| B01D 71/44 | (2006.01) |
| B01D 71/52 | (2006.01) |
| B01D 71/68 | (2006.01) |
| C08J 5/18 | (2006.01) |

(52) U.S. Cl.
CPC ....... *B01D 67/0013* (2013.01); *B01D 61/027* (2013.01); *B01D 67/0006* (2013.01); *B01D 67/0011* (2013.01); *B01D 67/00165* (2022.08); *B01D 69/02* (2013.01); *B01D 69/1214* (2022.08); *B01D 69/125* (2013.01); *B01D 71/441* (2022.08); *B01D 71/52* (2013.01); *B01D 71/68* (2013.01); *C02F 1/442* (2013.01); *C08J 5/18* (2013.01); B01D 2323/081 (2022.08); B01D 2323/12 (2013.01); B01D 2323/22 (2013.01); B01D 2323/30 (2013.01); B01D 2325/20 (2013.01); B01D 2325/34 (2013.01); C08J 2339/06 (2013.01); C08J 2371/00 (2013.01); C08J 2381/06 (2013.01)

(58) Field of Classification Search
CPC ............ B01D 67/0013; B01D 67/0006; B01D 67/0011; B01D 67/0016; B01D 67/00111; B01D 67/00165; B01D 67/0018; B01D 67/0088; B01D 67/0009; B01D 67/00; B01D 61/027; B01D 61/02; B01D 69/02; B01D 69/125; B01D 69/1071; B01D 69/06; B01D 69/12; B01D 69/10; B01D 71/44; B01D 71/52; B01D 71/68; B01D 71/441; B01D 71/261; B01D 71/26; B01D 2323/08; B01D 2323/12; B01D 2323/22; B01D 2323/30; B01D 2323/2187; B01D 2325/20; B01D 2325/022; B01D 2325/30; B01D 2325/34; B01D 2325/36; B01D 2325/38; B01D 53/22; C02F 1/442; C02F 1/44; C08J 5/18; C08J 2339/06; C08J 2371/00; C08J 2381/06

USPC ......................................................... 210/654
See application file for complete search history.

(56) References Cited

U.S. PATENT DOCUMENTS

| | | |
|---|---|---|
| 4,277,344 A | 7/1981 | Cadotte |
| 4,720,343 A | 1/1988 | Walch et al. |
| 4,758,343 A | 7/1988 | Sasaki et al. |
| 5,543,465 A | 8/1996 | Bell et al. |
| 5,762,798 A | 6/1998 | Wenthold et al. |
| 5,814,372 A | 9/1998 | Moya |
| 5,922,293 A | 7/1999 | Miyoshi et al. |
| 9,943,811 B2 | 4/2018 | Perry et al. |
| 2006/0228483 A1* | 10/2006 | Abidine ............. B01D 67/0006 427/331 |
| 2008/0214687 A1 | 9/2008 | Muller et al. |
| 2011/0147308 A1 | 6/2011 | Johnston-Hall et al. |

FOREIGN PATENT DOCUMENTS

| | | |
|---|---|---|
| AU | 2006261581 A1 | 12/2006 |
| CN | 1744940 A | 3/2006 |
| CN | 101072628 A | 11/2007 |
| EP | 0615778 A1 | 9/1994 |
| JP | S58104940 A | 6/1983 |

(Continued)

OTHER PUBLICATIONS

JPS 6238205 A (Year: 1987) English description, Tamada Makoto, Feb. 19, 1987.*

(Continued)

*Primary Examiner* — Akash K Varma

(57) ABSTRACT

Embodiments of the present invention relate to a nanofiltration composite membrane for use to purify water, the methods for preparing said nanofiltration composite membranes and to the nanofiltration composite membranes prepared accordingly.

16 Claims, No Drawings

(56) References Cited

FOREIGN PATENT DOCUMENTS

| JP | 62038205 A2 | 2/1987 | |
| JP | S 6238205 A * | 2/1987 | ............. B01D 67/00 |
| JP | H073043 A | 1/1995 | |
| JP | 2006517469 A | 7/2006 | |
| JP | 2008543546 A | 12/2008 | |
| JP | 2017524523 A | 8/2017 | |
| KR | 20110079153 A | 7/2011 | |
| KR | 20170009869 A | 1/2017 | |
| WO | 2011118808 A1 | 9/2011 | |

OTHER PUBLICATIONS

Chinese Patent Application No. 201980043446.3, Office Action dated Jan. 27, 2022.

European Patent Application No. 19732365.2, European Office Action dated Jun. 13, 2022.

Indian Patent Application No. 202117002685, Office Action dated Aug. 22, 2022.

Japanese Patent Application No. 2020-572719, Office action dated Jan. 11, 2022—English Translation available.

Persulfates Technical Information, Peroxychem, (Feb. 24, 2017), XP055621730, available on the Internet at www.peroxychem.comjmedia/241528, 16 pages.

International Search Report from corresponding International Application No. PCT/EP2019/066585, dated Sep. 30, 2019, three pages.

European Patent Application No. 19732365.2, Office Action dated Apr. 3, 2023.

Japanese Patent Application No. 2020572719, Written Opinion dated Apr. 8, 2022.

Japanese Patent Application No. 2020572719, Decision to Grant dated Jul. 26, 2022.

Israeli Patent Application No. 279666, Office Action dated Dec. 12, 2023.

Indian Patent Application No. 202117002685, Hearing Notice dated May 11, 2023.

European Patent Application No. 19732365.2, Office Action dated dated Sep. 24, 2024.

Korean Patent Application No. 10-2021-7002230, Office Action dated Sep. 23, 2024.

* cited by examiner

ALKALI-STABLE NANOFILTRATION COMPOSITE MEMBRANE AND METHOD OF MANUFACTURE THEREOF

Embodiments of the present invention relate to a nanofiltration composite membrane for use to purify water, the methods for preparing said nanofiltration composite membranes and to the nanofiltration composite membranes prepared accordingly.

Membrane filtration is a well-known technique in water treatment for removing contaminants due to their selective permeability. The contaminants could be present in the form of suspended, colloids, or dissolved, down to the size of ions. Porous semipermeable membranes include microfiltration (MF), ultrafiltration (UF), and nanofiltration (NF). Their mechanism in removing contaminants relies highly on steric hindrance. Reverse osmosis (RO) membrane, on the other hand, is considered as dense membrane, characterized with its capabilities of removing substances down to the size of monovalent ion.

Nanofiltration, defined as a process with characteristics between those of ultrafiltration and reverse osmosis, is a known technology in drinking water treatment and wastewater reclamation. This technology has been employed to remove impurities such as salts, hardness, pathogens, turbidity, disinfection-byproduct precursors, pesticides and other potable water contaminants. The use of polymeric membrane in mining applications, where the feed water pH and temperature are out of the standard operating conditions for water treatment, have been gaining attention in the last decade. These membranes are applied mainly for separation of metals and recovery of acid or alkali. In industrial wastewater treatment, for example for treating acid mine drainage, both reverse osmosis and nanofiltration are well established methods for metal removal. They are highly efficient, cost effective and easily to operate processes. In the face of an ever increasing stringent environmental criteria, applications of reverse osmosis and nanofiltration are gaining acceptance from the mining industry. Nanofiltration can be used to concentrate and recover metals which can be exploited as an invaluable resource commodity. While standard polymeric membranes are often used in the treatment process, they are operated beyond their chemical and mechanical stability limits, and thus have a very short lifetime. It is not uncommon that these nanofiltration membranes are degraded after 600 hours of operation or after 30 days under such extreme conditions.

Nanofiltration membranes are considered as membrane with a molecular weight cutoff (MWCO) of approximately between 200 g/mol to 1000 g/mol. Compounds smaller than 1000 g/mol, which are commonly salts, can be fractionated by nanofiltration membranes; nanofiltration membranes are capable to retain divalent ions, while permeating monovalent ions. These unique characteristics make the application of nanofiltration membranes suitable for metal recovery such as in mining processes, where the metal is retained by the membrane, and the liquor portion usually in the form of acidic or alkaline solution permeates through the membrane.

U.S. Pat. No. 5,814,372 discloses an ultrafiltration composite porous membrane based on a first polyolefin polymer and a second self-crosslinkable polymer which has been prepared by impregnating the polyolefin polymer with a solution of an uncrosslinked, self-crosslinkable polymer composition in the presence of a free radical polymerization initiator and heating and washing this membrane. The prepared ultrafiltration composite porous membrane does not show any nanofiltration properties and is not stable in highly alkaline solutions.

U.S. Pat. No. 5,762,798 discloses an asymmetrical, microporous hollow fiber membrane based on a polymeric solution comprising a fiber-forming polysulfone polymer, a polyvinyl pyrrolidone and an aprotic solvent. This membrane does not exhibit nanofiltration properties as the molecular weight cutoff lies between 17000 and 65000 g/mol, and is therefore not usable in mining processes for the recovery of metal salts such as copper, gold and uranium.

Commercially available nanofiltration membranes are generally composed of two or more asymmetrical layers, denoted as composite membrane. The layers include a nonwoven support, onto which a microporous membrane made of polysulfone, polyethersulfone, polyvinylidene fluoride, polyacrylonitrile or cellulose acetate is coated. The top layer is usually a thin layer produced via interfacial polymerization.

Different kinds of nanofiltration membrane manufacturing processes are known.

U.S. Pat. No. 5,922,293 discloses the manufacture of a composite nanofiltration membrane, with a microporous support membrane such as polysulfone or polyethersulfone. A monomeric bipiperidine reactant and an amine-reactive polyfunctional aromatic or cycloaliphatic acyl halide are interfacially polymerized on top of the support membrane. U.S. Pat. No. 4,758,343 discloses the manufacture of a composite filtration membrane with nanofiltration or reverse osmosis characteristics, comprises of a microporous polysulfone substrate, covered by an ultra-thin membrane comprises of a crosslinked piperazine polyamide. U.S. Pat. No. 4,277,344 discloses the manufacture of a composite filtration membrane with reverse osmosis characteristics, of which an aromatic polyamine is reacted interfacially with an aromatic acyl halide on a porous polysulfone support membrane.

All three processes comprise the same disadvantage namely that the active layer of the composites nanofiltration membrane or reverse osmosis membrane furthermore does not exhibit alkali nor acid stability, and thus cannot be used in mining processes for the recovery of metal salts in highly alkaline liquor.

In addition, the manufacturing process of the membrane in all three prior arts mentioned above are technically inconvenient and hence costly and the composite nanofiltration or reverse osmosis membranes obtained are insufficiently resistant at highly alkaline pH values.

US-A 2011/0147308 describes the preparation of a charged ultrafiltration and microfiltration polymeric membranes. The preparation process is based on polyvinylidene difluoride and positively charged polyvinyl pyrrolidone copolymers. The prepared membrane has furthermore disadvantage in view of filtration properties due to their large pore size and inability to separate metal salts from the bulk solution, and is therefore not employable in mining processes for the recovery of metal salts such as copper, gold and uranium.

Another important aspect for a composite nanofiltration membrane to be economically viable to manufacture is the production steps, whether they involved difficult chemical reactions and whether they are suitable for a continuous roll-to-roll production.

WO-A 2010/082194 discloses the manufacturing process of solvent and acid stable nanofiltration membrane. In this prior art, a polyacrylonitrile (PAN) based UF support membrane is modified using polyethylenimine (PEI) solution, followed by heat-treatment in a reactor at 90° C. for 17 to 32 hours, then cured for 1 hour in an oven at 90° C., and finally washed. Due to the long treatments needed in each manufacturing step, this manufacturing method is only suitable for batch process and hence the membrane is economically less viable to manufacture. Also in this prior art, the chemical process involved is an ozonation reaction or chlorosulfonation reaction. The manufacturing process of the composite nanofiltration membrane is economically disadvantaged since further improvement such as shortening the heat-treatment and curing steps are required to make the membrane described in WO-A 2010/082194 suitable for a continuous roll-to-roll production. Furthermore, toxic compounds as ozone and chlorosulfonic acid has to be used, making the manufacturing process of said membrane toxicologically disadvantaged. Moreover, the membrane described in WO-A 2010/082194 is not sufficiently alkali stable.

There accordingly continued to be a need for a process for preparing a composite nanofiltration membrane, having nanofiltration properties inexpensively and overcoming known technological disadvantage.

It was found that, surprisingly, the process of the present invention provides a composite nanofiltration membrane which exhibits alkali stability at pH 12 or above, having a high magnesium sulfate rejection and a high permeate water flux after being subjected to extreme conditions and which solves the known disadvantages of the state of the art.

The invention accordingly provides a process for preparation of nanofiltration composite membranes, wherein,
in a step a.) at least one polymer selected from the group consisting of polysulfone polymer, polyether polymer and mixtures thereof and at least one polyvinyl pyrrolidone polymer is solved in at least one aprotic solvent to prepare a casting solution and
in a step b.) the casting solution of step a.) is casted on a non-woven fabric and
in a step c.) the casted non-woven fabric of step b.) will be brought into contact with a polar non-solvent to coagulate the membrane and
in a step d.) the casted non-woven fabric membrane of step c.) will be brought into contact with at least one radical polymerization initiator and
in a step e.) the casted non-woven fabric membrane of step d.) will be brought into contact with a non-solvent for washing and
in a step f.) the casted non-woven fabric membrane of step e.) is cross-linked to the nanofiltration composite membrane.

In one preferred embodiment of the present invention the nanofiltration composite membranes have an average molecular weight cut-off between 200 g/mol to 1000 g/mol, meaning that the membranes exhibit nanofiltration properties. More preferably, the nanofiltration composite membranes have an average molecular weight cut-off of 500 g/mol to 1000 g/mol. The average molecular weight cut-off is the upper molecular weight limit of transport of compounds, above which less than 10% transport of compounds through the membrane occurs. The determination of the average molecular weight cut-off is described in the methods.

The polysulfone polymer according to this invention is preferred, polysulfone, polyethersulfone or polyarylene sulfone or mixtures of such polymers. More preferably, the polysulfone polymer is a polysulfone containing the following unit (I):

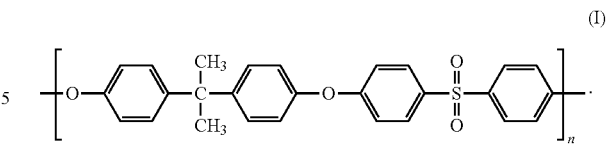

n is preferably 45 to 230, most preferably 120 to 150.

The polysulfone polymer preferably have an average molecular weight of 20,000 g/mol to 100,000 g/mol. More preferably, the average molecular weight is 55,000 g/mol to 65,000 g/mol.

The polyether polymer according to this invention is preferred polyethylene glycol and polypropylene glycol or mixtures of such polymers.

The polyether polymer preferably have an average molecular weight of 106 g/mol to 100,000 g/mol. More preferably, the average molecular weight is 106 g/mol to 12,000 g/mol and most preferably, the average molecular weight is 200 g/mol to 1,000 g/mol.

The polyvinyl pyrrolidone polymer contains preferably the following chemical unit (II)

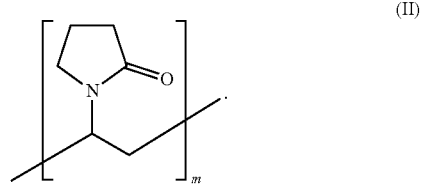

m is preferably 110 to 1100, most preferably 110 to 700.

The polyvinyl pyrrolidone polymer in this present invention has preferably an average molecular weight of 10,000 to 100,000 g/mol, preferably of 10,000 to 60,000 g/mol.

In another embodiment of the invention polyvinyl pyrrolidone polymer is preferably vinyl pyrrolidone/vinylacetate copolymers, vinyl pyrrolidone/styrene copolymers, vinyl pyrrolidone/dimethylaminoethyl methacrylate copolymers, or mixtures thereof.

The aprotic solvent used in the present invention is chosen so as to be a suitable solvent for each of the polysulfone polymer or polyether polymer and the polyvinyl pyrrolidone polymer.

The aprotic solvent is preferably N-methyl pyrrolidone, dimethyl formamide, dimethyl sulfoxide and dimethyl acetamide or mixtures thereof. In highly preferred embodiments, dimethyl formamide is used as aprotic solvent.

The total amount of polymer used in step a.) is preferably 10 weight % to 22 weight %, and more preferably 17 weight % to 21 weight % based on the amount of the casting solution.

The amount of polysulfone and/or polyether polymer is preferably 9 weight % to 21 weight % based on the amount of the casting solution.

The amount of polyvinyl pyrrolidone polymer used in the casting solution is preferably 1 weight % to 10 weight % based upon the weight of the solution, more preferably at is 2 weight % to 5 weight % based upon the weight of the casting solution.

The amount of aprotic solvent is preferably 68 weight % to 89 weight % based on the amount of the casting solution, more preferably 74 weight % to 87 weight %. Most preferably, the amount of aprotic solvent is 78 weight % to 90 weight % based on the amount of the casting solution.

The non-woven fabric is preferably a polyolefin polymer. More preferably, the non-woven fabric is selected from the group of polyethylene, polypropylene and polymethylpenten and mixtures thereof. Much more preferably, the non-woven fabric is a mixture of polyethylene and polypropylene.

In a further embodiment of the invention, the weight per unit area of the non-woven fabric is 70 g/m² to 100 g/m², preferably 80 g/m² to 90 g/m². The thickness of the non-woven fabric is preferably 50 µm to 250 µm, preferably 100 µm to 200 µm.

In step b.) the casting solution of step a.) can be casted using any conventional methods. Preferably, in step b.) the casting solution of step a.) is casted on top of a non-woven fabric. The cast process can be performed with the use of but not limited to spreading knives, doctor blade, spray coater, die coater, or slot coater. The membrane can be cast manually, in which the casting solution is poured, spread and cast by hand, semi-automatically, in which the casting solution is poured by hand and cast by a moving knife, and automatically, in which the casting solution is poured and/or cast into a moving bed. Preferably, the casting solution is casted semi-automatically, more preferably the casting solution is casted automatically.

The non-solvent in step c.) is in general miscible with the aprotic solvent but does not dissolve the polysulfone polymer and the polyether polymer. The non-solvent is preferably water or alcohols or mixtures thereof. The alcohols used as non-solvent are preferably monohydric alcohols, e.g. methanol, ethanol, 1-propanol, 2-propanol, n-butanol, i-butanol, t-butanol, 1-pentanol, 2-pentanol, 3-pentanol, hexanol, heptanol, octanol, nonanol, 2-methyl-1-propanol, 2-methyl-2-propanol, 2-pentanol, 3-pentanol, 2-methyl-1-butanol, 3-methyl-1-butanol, 2-methyl-2-butanol, 3-methyl-2-butanol, 2,2-dimethyl-1-propanol or dihydric alcohols, e.g. 1,2-ethanediol, 1,2-propanediol, 1,3-propanediol, 1,2-butanediol, 1,3-butanediol, 1,4-butanediol, 2,3-butanediol, 1,5-pentanediol or trihydric alcohols, e.g. 1,2,3-propanetriol or alcohols such as, for example, cyclopentanol, cyclohexanol, prop-2-en-1-ol, but-2-en-1-ol or mixtures thereof. Most preferably, the non-solvent is water. The amount of water in the polar non-solvent is preferably more than 90 weight % based on the amount of the polar non-solvent.

In step c.) the phase separation is induced. In highly preferred embodiments, the time between step b.) and step c.) is less than 20 seconds, most preferably less than 10 seconds. In step c.) the phase separation is accomplished by bringing the casted nonwoven fabric into the contact with at least one polar non-solvent. Preferably, the casted nonwoven fabric of step b.) will be brought into a bath of polar non-solvent. Other common techniques are known as, for example, spraying the polar non-solvent on the casted non-woven fabric. Preferably step c.) is conducted at a temperature of 1° C. to 7° C., more preferably at 3° C. to 6° C.

The radical polymerization initiator used in step d.) is selected from the group consisting of persulfate, peroxide or azo compounds. The radical polymerization initiator is preferably ammonium persulfate, potassium sodium persulfate, persulfate, 4,4'-azobis(4-cyanovalericacid) 2,2'-azobis(2-amidinopropane)hydrochloride, and potassium hydrogen persulfate, benzoyl peroxide, 2,2'-azobisisobutyronitrile, 2,2'-azobis(2-methylpropionamidine)dihydrochloride, 2,2'-Azobis [2-(2-imidazolin-2-yl) propane] and dimethyl 2,2'-azobis(2-methylpropionate) or mixtures thereof. Most preferably the radical polymerization initiator is ammonium persulfate.

In step d.) the radical polymerization initiator is preferably used in liquid form. If the radical polymerization initiator is used in a liquid form then the radical polymerization initiator is usually solved in a solvent. The solvent which can be used in step d.) for solving the radical polymerization initiator is preferably any organic or inorganic polar solvent. Preferably, the radical polymerization initiator will be solved in water. The radical polymerization initiator is preferably used in an amount of 0.3 weight % to 6 weight % based upon the weight of the solvent used in step d.). More preferably, the radical polymerization initiator is preferably used in an amount of 1 weight % and 2.5 weight % based upon the weight of the solvent used in step d.).

If the radical polymerization initiator will be used in a liquid form then in step d.) the dissolved radical polymerization initiator will be brought into contact with the membrane over its entire surface. In the preferred embodiments, the contact can be accomplished through several means such as dipping, showering, spraying, or pouring.

In step d.) the preferred contact time of the radical polymerization initiator with the casted non-woven fabric membrane of step c.) in the present invention is about 30 seconds to 5 minutes, highly preferably the preferred contact time is 1 minute to 3 minutes.

In the next step e.) the casted non-woven fabric membrane from step d.) will be brought into contact with a non-solvent for washing.

Also in step e.) the same non-solvents can be used as in step c.) In one further preferred embodiment of the invention, the non-solvent which is used in step e.) is water. In one further preferred embodiment of the invention, the casted non-woven fabric membrane is brought into contact with the non-solvent at a temperature of 15° C. to 80° C., highly preferably at a temperature of 25° C. to 65° C. In step e.) the casted non-woven fabric membrane of step d.) can be brought into contact with the non-solvent by dipping, showering, spraying or pouring. Preferably, in step e.) the casted non-woven fabric membrane of step d.) will be brought into contact with the non-solvent for 1 to 30 minutes, most preferably for 5 to 15 minutes.

We have found that step e.) before performing of step f.) is important to remove the rest of solvent from the casting solution which may alter the macroporous structure of the membrane.

In step f.) crosslinking of the casted non-woven fabric membrane prepared in step e.) can be initiated by exposure to heat or exposure to radiation, such as ultraviolet (UV) and electron beam. Alternatively, a combination of heat or radiation may also be used.

Preferably, crosslinking is initiated by exposure to heat. Therefore, step f.) shall be preferably performed at a temperature of 75° C. to 130° C., most preferably of 80° C. to 110° C. The time need for cross-linking in step f.) is preferably 1 to 20 minutes, more preferably 5 to 10 minutes. If electron beam radiation will be used for cross-linking in step f.) then, preferably the irradiation dosage is 100 to 300 kGy, highly preferably is 150 to 200 kGy. In a further preferred embodiment of the invention, cross-linking is initiated by heat and continued by electron beam radiation.

In a further embodiment of the present invention, the nanofiltration composite membranes comprise a non-woven fabric which is coated by a cross-linked nanofiltration membrane comprising at least one polysulfone polymer or at least one polyolefin polymer or mixtures thereof and at least one polyvinyl pyrrolidone.

In an further embodiment of the present invention, the nanofiltration composite membranes of the present invention are prepared according to the inventive process.

The nanofiltration composite membranes obtained as per the process of the present invention are particularly suitable for purifying of water, especially of surface water, groundwater, borehole water, brackish water, seawater, and for reclamation of municipal or industrial wastewater. For applications in the industry, the nanofiltration composite membrane in the present invention are particularly suitable for concentration, demineralization and reuse of various industrial water. For applications in mining, the nanofiltration composite membrane in the present invention are particularly suitable for metal salts recovery and purification of alkaline water.

The nanofiltration composite membranes of the present invention exhibit high magnesium sulfate rejection. Preferably, the magnesium sulfate rejection of a feed concentration of 2000 mg/l at 25° C. and 10 bar is between 60% to 99%, with a permeate flux of 1 to 6 L·m$^{-2}$·h$^{-1}$·bar$^{-1}$ measured in accordance to ASTM D4194-03. More preferably, the nanofiltration composite membrane of the present invention exhibit a magnesium sulfate rejection of a feed concentration of 2000 mg/l at 25° C. and 10 bar of more than 80% and a permeate flux of at least 1 L·m$^{-2}$·h$^{-1}$·bar$^{-1}$ measured in accordance to ASTM D4194-03.

The nanofiltration composite membranes according to this invention exhibit a change in magnesium sulfate rejection measured according to the description in the methods section of less than 10% for at least 60 days at pH values of 12 and higher. Therefore, the nanofiltration composites membranes according to this invention shows high stability at pH values 12 or higher. Moreover, the nanofiltration composite membranes can be easily applied in a roll-to-roll manufacturing process for membrane elements. The cost for the manufacturing of the membrane elements can be reduced. In addition, formerly required preparation steps can be avoided making the process much more economical and more efficient. The use of toxic chemical compounds such as ozone and chlorosulfonic acid can be avoided and the safety of the manufacturing process can be increased.

Methods

Method for the Determination of Salt Rejection and Permeate Flux

In order to characterize the performance of a membrane, one normally looks into their solute rejection characteristics. Rejection of a membrane is calculated using the following equation:

$$R = \frac{c(\text{Feed}) - c(\text{Permeate})}{c(\text{Feed})} \times 100[\%],$$

where c denotes the concentration of the solutes. The rejection is then described as the amount of solute removed by measuring the concentration left in the permeate relative to the initial concentration in the feed. In the present invention, the rejection experiments are conducted under strictly controlled conditions and following the procedures described in the ASTM D4194-03, in particular for Test Method B: Nanofiltration devices. These experiments are conducted in a pilot-scale coupon tester, using coupons cut from sheets of membrane with a diameter of 9.6 cm, and placed in twelve, parallel connected filtration cells in a closed-loop, cross-flow configuration. The cells are fed with 60 L of feed water coming from a 100 L tank, which is connected to a high pressure, 4-pole pump (Danfoss, Offenbach am Main, Germany). Permeate is collected from a tap on each cell, whereas the concentrate flows back into the feed tank. The tester is equipped with a UV lamp to prevent any bacterial growth, a cooling system to control the feed water temperature and various pressure gauges to regulate the flow. The coupon tester cells are designed to have a high cross flow velocity and very low permeate recovery ratio such that concentration polarization can be minimized. The crossflow velocity in the rejection experiment was 6.67× 10$^{-5}$ m$^3$/s (4 L/min).

In each rejection experiment, feed water containing 2,000 mg/L of MgSO$_4$ was prepared in the feed tank. Temperature of the feed water was automatically controlled and adjusted to 25° C. The pH of the feed water was adjusted to pH=7 using HCl and NaOH. For each rejection experiment, membrane coupons were conditioned with the feed water inside the coupon test cells for at least 1 hour before sampling was performed. Permeate from each cell was collected for rejection analysis and the permeate flux was determined. The measurement was repeated 2 hours after start-up and hourly thereafter until three successive permeate flow rates and salt passages agree within 5%. Rejection experiments at standard test conditions (i.e. 2,000 mg/L MgSO$_4$, pH 7, 25° C.) were conducted prior to and after every set of treatment (for e.g. after treatment of NaOH), to ensure that membrane coupons were not damaged and maintaining stable performance. During rejection experiments where the pH was varied or when different compounds were tested, the same membrane coupons were used as long as defects were not observed. In this case, the coupons were carefully conserved and the coupon tester (feed tank and all piping) were thoroughly cleaned, until the feed and permeate analysis showed a conductivity of less than 5 μS/cm and/or total organic compound (TOC) value less than 1 mg/L. This analysis was performed using a TOC measurement device (Analytik Jena, multi N/C 3100, Jena, Germany) according to DIN EN1484. The feed and permeate pH values were checked using a pH meter (SCHOTT, Mainz, Germany). The concentration of magnesium sulfate in the feed and permeate water was determined using a Prolab 4000 conductivity meter (SCHOTT, Mainz, Germany). In order to calculate the membrane rejection, a calibration curve was constructed to establish a relationship between the concentration of magnesium sulfate and conductivity.

Another important aspect for a membrane to be economically viable is their permeate flux, defined as the rate of permeate flow per unit of membrane area, shown by the following equation:

$$J = \frac{Q_p}{A_m}$$

where J is the rate of permeate flux in L·h$^{-1}$·m$^{-2}$ (gal·d$^{-1}$·ft$^{-2}$), $Q_p$ is the rate of filtrate through the membrane in L·h$^{-1}$ (gal·d$^{-1}$), and $A_m$ is the membrane surface area in m$^2$ (ft$^2$). The permeate flux depends not only from the intrinsic property of the membrane and the feed solution, but also depends on the transmembrane pressure (TMP). Transmembrane pressure is defined as the pressure gradient of the membrane, calculated by subtracting the operating pressure with the osmotic pressure of the feed solution and the permeate pressure. As pressure is the main driving force of filtration that translates directly into energy consumption, this parameter often becomes the measure of economic viability of a filtration process. In all rejection experiments, the operating pressure was kept at $10^3$ kPa.

After the membrane is equilibrated in the filtration system for at least 2 hours, permeate water is collected. Sample of permeate water coming out from individual tap is collected from each test cell into a beaker. The weight of the beaker is previously determined and the time of which the permeate water is being collected is noted. Once the desired volume of the permeate sample is reached, the filled beaker is once again weighed. The weight difference of the empty and filled beaker denotes the volume of the collected permeate water. $Q_p$ can then be calculated by the following equation:

$$Q_p = \frac{V_p}{t}$$

where $V_p$ is the volume of the collected permeate (ml) and t is the time needed to collect said volume (min).

Method for the Determination of Average Molecular Weight Cut-Off

The average molecular weight cut-off (MWCO) of the membrane in the present invention is determined empirically using a retention-solute size curve. This method was first described by Jonsson Desalination, 53, (1985), 3-10, to measure the pore size of ultrafiltration membrane. A standard method for evaluation of MWCO in a flat sheet ultrafiltration membrane is also described in ASTM E1343-90 (2001), which can be expanded to molecular weight from 100 to 2 000 000 g/mol. As nanofiltration membrane is also considered as porous membrane with a molecular weight cutoff between 200 to 1000 g/mol, an adapted method for pore size measurement has been applied in this invention.

MWCO is described as the upper molecular weight limit of transport of compound, above which less than 10% transport of compound through the membrane occurs. In MWCO determination, non-ionic compounds of known molecular weights are chosen. These compounds typically include polyethylene glycol (PEG) for molecular weight between 100 g/mol to 30,000 g/mol, dextran for molecular weight between 40,000 g/mol to 70,000 g/mol, and polyethylene oxide for molecular weight of 100,000 g/mol and above. At least 6 different molecular weight compounds should be tested for the MWCO determination. The highest chosen molecular weight compound has to be rejected more than 90% by the membrane.

In the present method, different PEGs with molecular weight of 1000 g/mol and smaller are chosen for MWCO determination, namely 200 g/mol, 300 g/mol, 400 g/mol, 600 g/mol, 800 g/mol and 1000 g/mol. Feed water containing 200 mg/L PEG is prepared in 60 L volume of solution. The temperature and pH are kept constant at 7 and 25° C., respectively in each rejection experiment. All other conditions such as feed volume, feed crossflow velocity, operating pressure, and permeate recovery were as described in 'Method for determination of salt rejection and permeate flux'. Rejection experiment using at least 4 coupons is conducted for each PEG molecular weight. Permeate water samples are collected from each test cell after the membrane is equilibrated for at least 2 hours in the filtration system. A TOC measurement device (Analytik Jena, multi N/C 3100, Jena, Germany) was used to measure PEG concentrations in the feed and permeate water under Non-Purgeable Organic Carbon (NPOC) mode according to the DIN EN1484. Dilutions were performed for the feed samples before measurement. Rejection of the compound is determined by calculating the PEG concentration in the permeate relative to the PEG concentration in the feed.

Rejection experiments at standard test conditions (i.e. 2,000 mg/L $MgSO_4$, pH 7, 25° C.) were conducted prior to and after every set of rejection experiments (i.e. each variation of PEG molecular weight), to ensure that membrane coupons were not damaged and maintaining stable performance. During PEG rejection experiments, the same membrane coupons were used as long as defects were not observed. In this case, the coupons were carefully conserved and the coupon tester (feed tank and all piping) were thoroughly cleaned, until the feed and permeate analysis showed a conductivity of less than 5 µS/cm and/or total organic compound (TOC) value less than 1 mg/L.

A retention-solute size curve is plotted using the rejection data obtained from the TOC measurement. The membrane MWCO is empirically determined using the plot as the molecular weight at which the membrane rejects 90% of the solute.

The following examples illustrate the present invention and are not intended to limit the same.

EXAMPLES

Example 1

A nanofiltration composite membrane was prepared and casted from a homogeneous solution of polysulfone and polyvinyl pyrrolidone in dimethyl formamide as follows:

A homogeneous casting solution was prepared from 18 weight % of a polysulfone of the formula (I) having an average molecular weight of 60.000 g/mol (Ultrason® S 6010, BASF GmbH), 2 weight % of a polyvinyl pyrrolidone of the formula (II) having an average molecular weight of 40.000 g/mol (Povidon K-30 (Sigma Aldrich GmbH)) and 80 weight % dimethyl formamide. The casting solution was maintained at room temperature and membranes were casted on a polypropylene-based non-woven fabric with a weight per unit area of 85 g/m². The casted membranes were coagulated immediately in a 5° C. water bath to form microporous membranes. After coagulation, the membranes were soaked in 1 weight % ammonium persulfate solution for 1 minute. Following this, membrane 1B was washed in a water bath at 60° C. for 5 minutes, while Membrane 1A did not receive any washing treatment. Membranes 1A and 1B were then crosslinked in an oven at 90° C. for 10 minutes.

The resulting membranes were tested for their salt rejection and permeation flux in a crossflow filtration system, containing a feed solution of 2000 mg/L $MgSO_4$ at an operating pressure of $10^3$ kPa and a volumetric crossflow of 4 L/h (see 'Method for the determination of salt rejection and permeate flux' for details, measured according to ASTM D4194-03). The feed water pH and temperature was kept at 7 and 25° C., respectively. Table 1 shows the result of the permeate flux and salt rejection measurement after 4 hours of filtration, in order to ensure that equilibrium has been reached.

TABLE 1

| Membrane No. | Membrane 1A Without washing | | Membrane 1B Washing at 60° C. | |
|---|---|---|---|---|
| | Flux (LMH) | Rejection (%) | Flux (LMH) | Rejection (%) |
| 1 | 110 | 23.2 | 11 | 93.8 |

Membrane 1B has an average molecular weight cut-off of 620 g/mol determined according to modified ASTM E1343-90 (2001) as described under "Method for the determination of average molecular weight cut-off". The membrane 1A does not have nanofiltration properties and exhibit an average molecular weight cut-off higher than 1000 g/mol.

It has been surprisingly found that after additional polymerization by using a polymerization initiator a washing step with a non-solvent is required before crosslinking has been performed. According to this procedure, nanofiltration composite membranes with high rejection performance and high alkaline stability can be prepared.

Example 2

A nanofiltration composite membrane was prepared and casted from a homogeneous solution of polysulfone and polyvinyl pyrrolidone in dimethyl formamide as the solvent as follows:

A homogeneous casting solution was prepared from 17.5 weight % of a polysulfone of the formula (I) having an average molecular weight of 60.000 g/mol (Ultrason® S 6010, BASF GmbH), 2.5 weight % of a polyvinyl pyrrolidone of the formula (II) having an average molecular weight of 40.000 g/mol (Povidon K-30 (Sigma Aldrich GmbH)) and 80 weight % dimethyl formamide. The casting solution was maintained at room temperature and membranes were casted on a polypropylene-based non-woven fabric with a weight per unit area of 85 g/m². The casted membranes were coagulated immediately in a 5° C. water bath to form a microporous membrane. After coagulation, the membranes were soaked in 1% ammonium persulfate solution for 1 minutes. Following this, the membranes were washed in a water bath at 25° C. for 15 minutes. The membranes were then crosslinked in an oven at 80° C. for 60 minutes. As shown in Table 2, these membranes have rejection of $MgSO_4$ of more than 89% and an average molecular weight cut-off of 600 g/mol determined according to modified ASTM E1343-90 (2001).

Alkali treatment in NaOH solution was performed in order to test the membrane stability in high pH solution. The membranes were soaked in 20% NaOH solution at room temperature. pH value for this solution is 14.7 Membrane 2 was treated for 60 days and Membrane 3 was treated for 90 days. The resulting membranes were tested for their salt rejection and permeation flux in a crossflow filtration system, containing a feed solution of 2000 mg/L $MgSO_4$ at an operating pressure of $10^3$ kPa and a volumetric crossflow of 4 L/h, before and after the NaOH treatment (see 'Method for the determination of salt rejection and permeate flux' for details measured according to ASTM D4194-03). The feed water pH and temperature was kept at 7 and 25° C., respectively. Table 2 shows the result of the measurement after 4 hours of filtration, in order to ensure that equilibrium has been reached.

TABLE 2

| Membrane | Before NaOH treatment | | After NaOH treatment | |
| --- | --- | --- | --- | --- |
| No. | Flux (LMH) | Rejection (%) | Flux (LMH) | Rejection (%) |
| 2 | 14 | 89.2 | 17 | 83.8 |
| 3 | 12 | 89.2 | 19 | 81.6 |

Despite extreme treatment by high concentrated alkaline solutions, rejection and flux of the inventive membrane remains high and nearly stable. Example 3

A nanofiltration composite membrane was prepared and casted from a homogeneous solution of polysulfone and polyvinyl pyrrolidone in dimethyl formamide as follows:

A homogeneous casting solution was prepared from 18 weight % polysulfone (Ultrason® S 6010, BASF GmbH (average molecular weight is 60.000 g/mol), 2.5 weight % polyvinyl pyrrolidone (Povidon K-30 (Sigma Aldrich GmbH (average molecular weight is 40.000 g/mol)) and 79.5 weight % dimethyl formamide. The casting solution was maintained at room temperature and membranes were casted on a polypropylene-based non-woven fabric with a weight per unit area of 85 g/m². The casted membranes were coagulated immediately in a 5° C. water bath to form microporous membranes. After coagulation, Membrane 4A was soaked in 1 weight % ammonium persulfate solution for 1 minute, then washed in a water bath at 60° C. for 5 minutes, whereas Membrane 4B was first washed in a water bath at 60° C. for 5 minutes, and then soaked in 1 weight % ammonium persulfate solution for 1 minute. Membranes 4A and 4B were then crosslinked in an oven at 100° C. for 5 minutes.

The resulting membranes were tested for their salt rejection and permeation flux in a crossflow filtration system, containing a feed solution of 2000 mg/L $MgSO_4$ at an operating pressure of $10^3$ kPa and a volumetric crossflow of 4 L/h (see 'Method for the determination of salt rejection and permeate flux' for details, measured according to ASTM D4194-03). The feed water pH and temperature was kept at 7 and 25° C., respectively. Table 3 shows the result of the permeate flux and salt rejection measurement after 4 hours of filtration, in order to ensure that equilibrium has been reached.

TABLE 3

| | Membrane 4A Catalyst followed by washing | | Membrane 4B Washing followed by catalyst | |
| --- | --- | --- | --- | --- |
| Membrane No. | Flux (LMH) | Rejection (%) | Flux (LMH) | Rejection (%) |
| 4 | 14 | 88.5 | 94 | 26.6 |

This example shows that the order of catalyst and washing step is important to achieve nanofiltration performance of the membrane.

What is claimed is:

1. A process for preparation of a nanofiltration composite membrane, comprising steps of:
   a.) solving at least one polymer selected from the group consisting of polysulfone polymer, polyether polymer and mixtures thereof and at least one polyvinyl pyrrolidone polymer in at least one aprotic solvent to prepare a casting solution; and
   b.) casting the casting solution of step a.) on a non-woven fabric to prepare a casted non-woven fabric; and
   c.) bringing the casted non-woven fabric of step b.) into contact with a polar non-solvent to prepare a casted non-woven fabric membrane; and
   d.) bringing the casted non-woven fabric membrane of step c.) into contact with at least one radical polymerization initiator; and
   e.) washing the casted non-woven fabric membrane of step d.) with a non-solvent; and
   f.) cross-linking the casted non-woven fabric membrane of step e.) to prepare said nanofiltration composite membrane;

wherein the nanofiltration composite membrane has an average molecular weight cut-off between 200 g/mol to 1000 g/mol.

2. The process according to claim 1, wherein the polysulfone polymer is a polysulfone containing a following unit (I):

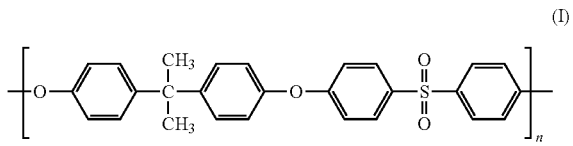

and n is 45 to 230.

3. The process according to claim 1, wherein the polyether polymer is selected from the group consisting of polyethylene glycol, polypropylene glycol and mixtures of such polymers.

4. The process according to claim 1, wherein a total amount of polymer used in step a.) is 10% weight to 22% weight based on an amount of the casting solution.

5. The process according to claim 1, wherein the at least one polyvinyl pyrrolidone polymer contains a following chemical unit (II):

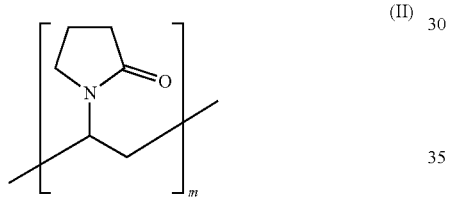

and m is 110 to 1100.

6. The process according to claim 1, wherein an amount of the at least one polyvinyl pyrrolidone polymer used in the casting solution is 1% weight to 10% weight based upon a weight of the casting solution.

7. The process according to claim 1, wherein the non-woven fabric in step b.) is selected from the group consisting of polyethylene, polypropylene, polymethylpentene and mixtures thereof.

8. The process according to claim 1, wherein a weight per unit area of the non-woven fabric is 70 to 100 g/m$^2$.

9. The process according to claim 1, wherein the at least one aprotic solvent in step a.) is selected from the group consisting of N-methyl pyrrolidone, dimethyl formamide, dimethyl sulfoxide and dimethyl acetamide or mixtures thereof.

10. The process according to claim 1, wherein step c.) will be conducted at a temperature of 3° C. to 6° C.

11. The process according claim 1, wherein after step d.) has been performed step f.) is performed at a temperature of 80° C. to 110° C.

12. The process according to claim 11, wherein step f.) will be performed in 1 to 20 minutes.

13. The process according to claim 1, wherein the nanofiltration composite membrane has the average molecular weight cut-off between 500 g/mol to 1000 g/mol.

14. The process according to claim 1, wherein a total amount of polymer used in step a.) is 17% weight to 21% weight based on an amount of the casting solution.

15. A process for preparation of a nanofiltration composite membrane, comprising steps of:
   a.) solving at least one polymer selected from the group consisting of polysulfone polymer, polyether polymer and mixtures thereof and at least one polyvinyl pyrrolidone polymer in at least one aprotic solvent to prepare a casting solution; and
   b.) casting the casting solution of step a.) on a non-woven fabric to prepare a casted non-woven fabric; and
   c.) bringing the casted non-woven fabric of step b.) into contact with a polar non-solvent to prepare a casted non-woven fabric membrane; and
   d.) bringing the casted non-woven fabric membrane of step c.) into contact with at least one radical polymerization initiator; and
   e.) washing the casted non-woven fabric membrane of step d.) with a non-solvent; and
   f.) cross-linking the casted non-woven fabric membrane of step e.) to prepare said nanofiltration composite membrane;
   wherein a weight per unit area of the non-woven fabric is 70 to 100 g/m$^2$.

16. A process for preparation of a nanofiltration composite membrane, comprising steps of:
   a.) solving at least one polymer selected from the group consisting of polysulfone polymer, polyether polymer and mixtures thereof and at least one polyvinyl pyrrolidone polymer in at least one aprotic solvent to prepare a casting solution; and
   b.) casting the casting solution of step a.) on a non-woven fabric to prepare a casted non-woven fabric; and
   c.) bringing the casted non-woven fabric of step b.) into contact with a polar non-solvent to prepare a casted non-woven fabric membrane; and
   d.) bringing the casted non-woven fabric membrane of step c.) into contact with at least one radical polymerization initiator; and
   e.) washing the casted non-woven fabric membrane of step d.) with a non-solvent; and
   f.) cross-linking the casted non-woven fabric membrane of step e.) to prepare said nanofiltration composite membrane;
   wherein a total amount of polymer used in step a.) is 10% weight to 22% weight based on an amount of the casting solution.

* * * * *